US011220939B1

(12) United States Patent
Jentz et al.

(10) Patent No.: US 11,220,939 B1
(45) Date of Patent: Jan. 11, 2022

(54) METHOD FOR MONITORING CRANKCASE VENTILATION INTEGRITY

(71) Applicant: Ford Global Technologies, LLC, Dearborn, MI (US)

(72) Inventors: Robert Jentz, Westland, MI (US); Matthew Carpenter, Northville, MI (US); Dennis Blanchard, Canton, MI (US); Michael Sweppy, Manchester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/027,279

(22) Filed: Sep. 21, 2020

(51) Int. Cl.
| | |
|---|---|
| F01M 11/10 | (2006.01) |
| F01M 13/02 | (2006.01) |
| F01M 13/04 | (2006.01) |
| F02D 41/22 | (2006.01) |
| G07C 5/08 | (2006.01) |
| F01M 13/00 | (2006.01) |

(52) U.S. Cl.
CPC .......... *F01M 11/10* (2013.01); *F01M 13/028* (2013.01); *F01M 13/04* (2013.01); *F02D 41/22* (2013.01); *G07C 5/0808* (2013.01); F01M 2013/0083 (2013.01); F01M 2250/00 (2013.01); F02D 2200/0404 (2013.01)

(58) Field of Classification Search
CPC ...... F01M 11/10; F01M 13/028; F01M 13/04; F01M 13/021; F01M 2250/00; F01M 2013/0083; G07C 5/0808; F02D 41/22; F02D 2200/0404; F02M 35/1036; F02M 35/10222; F02M 25/08
See application file for complete search history.

(56) References Cited

U.S. PATENT DOCUMENTS

| | | | |
|---|---|---|---|
| 9,260,990 B2 | 2/2016 | Rollinger et al. | |
| 9,316,131 B2 | 4/2016 | Rollinger et al. | |
| 9,664,079 B2 | 5/2017 | Jentz et al. | |
| 9,714,509 B2 | 7/2017 | Morgan et al. | |
| 10,767,590 B1 | 9/2020 | Jentz et al. | |
| 10,871,129 B1 | 12/2020 | Jentz et al. | |
| 2016/0097355 A1* | 4/2016 | Jentz | F02D 41/22 701/102 |
| 2017/0089302 A1* | 3/2017 | Jones | F01M 1/02 |
| 2017/0268448 A1* | 9/2017 | Takahashi | F01M 13/023 |

OTHER PUBLICATIONS

Jentz, R. et al., "Systems and Methods for Crankcase System Diagnostics," U.S. Appl. No. 16/816,039, filed Mar. 11, 2020, 46 pages.

* cited by examiner

*Primary Examiner* — George C Jin
(74) *Attorney, Agent, or Firm* — Gregory Brumbaugh; McCoy Russell LLP (57) ABSTRACT

Methods and systems are provided for monitoring a crankcase ventilation system. In one example, a method may include diagnosing a breach in a crankcase vent tube based on a regression of measurements of pressure in the crankcase vent tube. The regression allows the pressure measurements to be extended across an entire range of operating air flows and the breach may be identified by comparing the regressed pressure measurements to expected crankcase vent tube pressures.

18 Claims, 5 Drawing Sheets

METHOD FOR MONITORING CRANKCASE VENTILATION INTEGRITY

FIELD

The present description relates generally to methods and systems for crankcase ventilation systems.

BACKGROUND/SUMMARY

Positive crankcase ventilation (PCV) systems may be implemented in combustion engines to evacuate blow-by gases from a crankcase of an engine into an engine intake manifold. By venting the gases, accumulation of residue from the unburned gases may be reduced, thereby mitigating degradation of engine components in the crankcase. However, under certain conditions, a PCV system may experience a breach. For example, a fresh air hose (e.g., a breather tube or crankcase vent tube) may become disconnected, an oil cap may be off or loose, a dipstick may be out, and/or other seals in the crankcase ventilation system may be broken. The breach may lead to deterioration of engine component integrity.

In order to identify breaches, the PCV system may be periodically monitored, such as during on-board diagnostic (OBD) routines to meet a threshold emission standard. As one example, current California Air Resources Board (CARB) regulations demand an In-Use Performance Ratio (IUPR) of greater than 34% for OBD monitoring. Standard OBD demonstration cycles may require high air flows to reliably distinguish between intact and breached conditions. However, such flow rates may not be met during routine driving cycles, e.g., with little to no boosted combustion and low intake manifold pressure, particularly in high power-to-weight ratio vehicles. Monitoring frequency may be insufficient as a result and may, in some instances, lead to vehicle recall.

Attempts to at least partially address meeting guidelines for crankcase ventilation system monitoring include collecting and integrating data to evaluate presence of a breach. In one example, as shown by Jentz in U.S. Pat. No. 9,664,079, a method for indicating a breach in the system is based on obtaining a first integrated value of an error in change of actual crankcase vent tube pressure over a duration of transient engine airflow. The first integrated value is compared to a second integrated value of an error with respect to how expected crankcase vent tube pressure changes over the duration. Pressure data may be collected by a sensor arranged in a crankcase vent tube on an air intake side of the crankcase. The integration of the values over a duration of air flow reduces a completion time for obtaining diagnostic results without reducing accuracy of the data.

However, the inventors herein have recognized potential issues with such systems. As one example, the integration of data may rely on application of a gain factor for weighting the contribution of the pressure sensor as well as data manipulation with a noise floor. Inclusion of the gain factor and noise floor may add complexity to data processing and incur an increased likelihood of error in the calculations.

In addition, such systems depend on data collection at relatively high air flows to achieve fault separation. While this approach may be suitable for smaller engines relying on boosted operation to generate adequate torque for vehicle propulsion (e.g., low power-to-weight vehicles powered by fuel combustion) or diesel engines, high power-to-weight vehicles may operate infrequently at sufficiently high air flows for robust fault separation. For example, torque demand in high power-to-weight vehicles may be met under non-boosted operation, thus severely reducing data collection at high air flows. This may lead to inadequate fault separation and increase a likelihood of false fault detection. In order to meet CARB regulations for IUPR, the OBC calibrator, particularly in the high power-to-weight vehicles may, in some instances, bias calibration of a crankcase ventilation monitoring system such that false fault detection may be accepted. Such inaccurate detection may incur costly and unwarranted maintenance and repair.

In one example, the issues described above may be addressed by a method for indicating a breach in the crankcase ventilation system based on a regression of pressure measurements of a crankcase vent tube pressure over an entire range of operating engine air flows and comparison of the regressed pressure measurements to expected crankcase vent tube pressure over the entire range of operating engine air flows. In this way, a breach in the crankcase ventilation system at a clean side of the system may be detected even at airflows lower than demanded by the vehicle's OBD.

As one example, the regression may be used to generate a regression curve from pressure measurements collected by a crankcase pressure sensor. The crankcase pressure sensor may be placed on a clean side of an oil separator within a cam cover of an engine, allowing a breach, e.g., break or disconnection, in a crankcase vent tube to be detected. The pressure measurements may be plotted as a histogram and pressure values in each histogram bin may be averaged. The regression curve may be created from the averaged bin values, allowing pressure values to be extrapolated from low air flows to high air flows where data collection may be scarce. Comparison of the regression curve to expected pressure values at a calibrated air flow may enable identification of a breach in the crankcase ventilation system. The regression may allow a frequency of crankcase ventilation system monitoring to meet stringent regulations while providing robust evaluation of an integrity of the system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
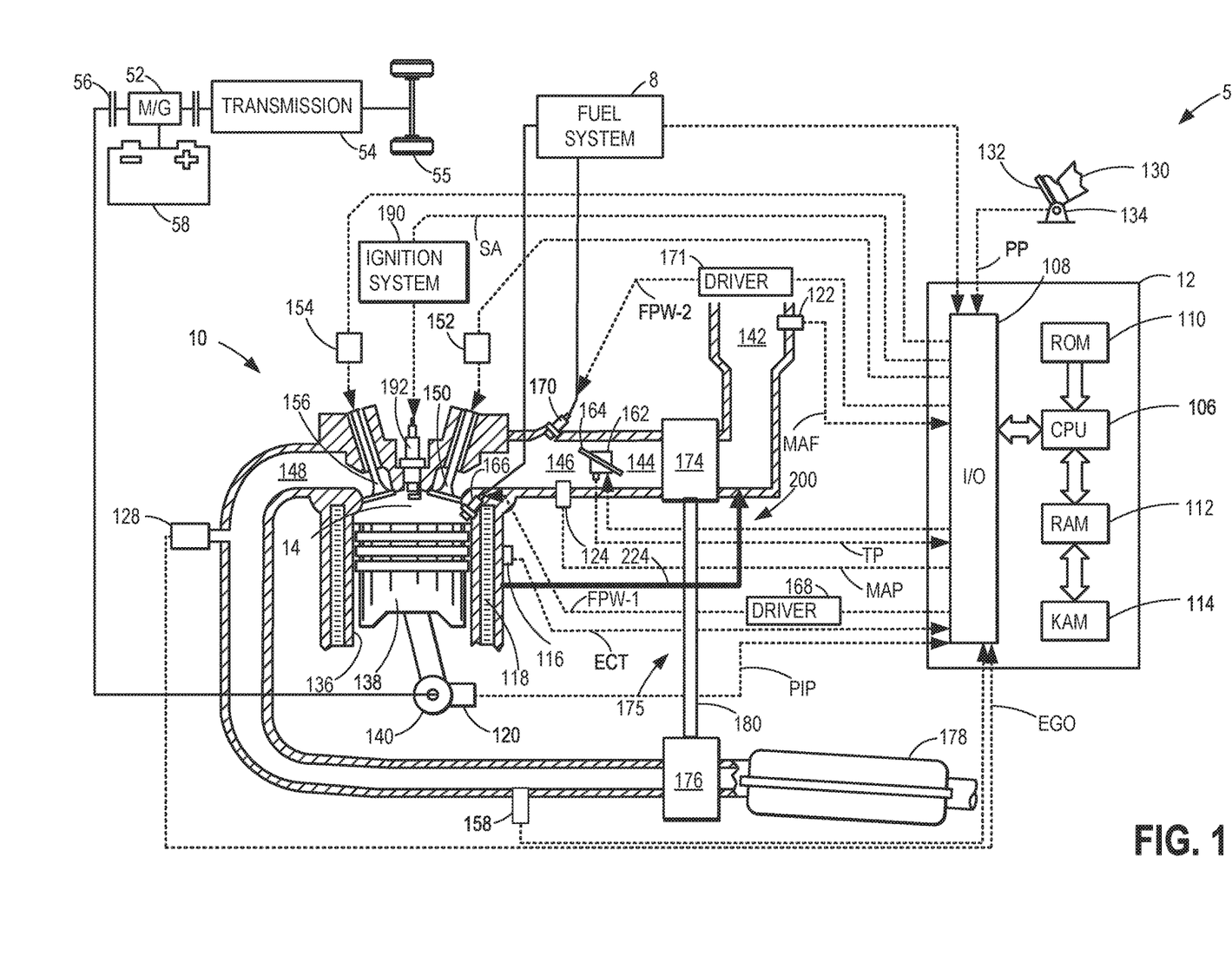
FIG. 1 shows an example of an engine system adapted with a positive crankcase ventilation (PCV) system.
Figure 2:
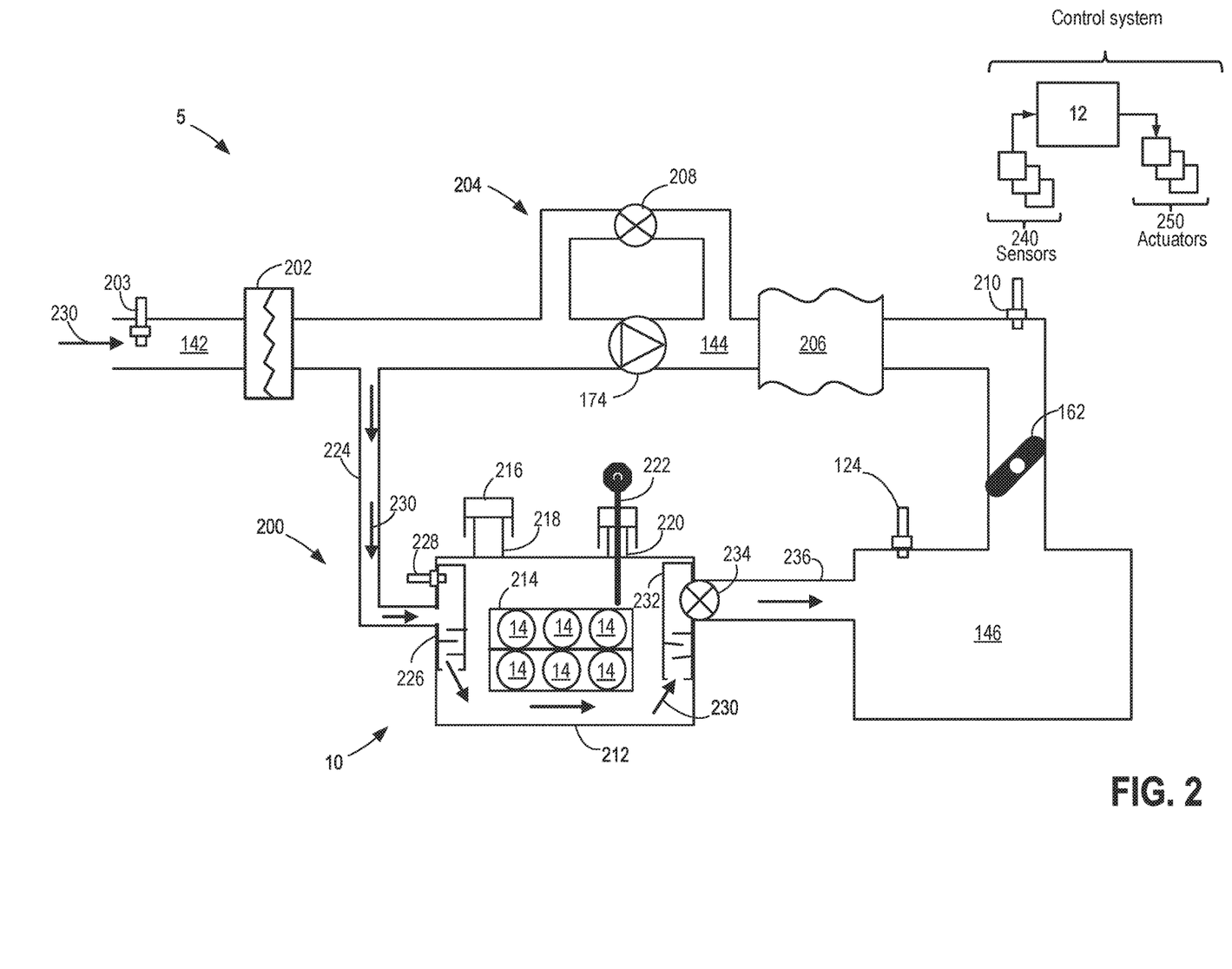
FIG. 2 shows a detailed schematic of the engine system and PCV system of FIG. 1.
Figure 3:
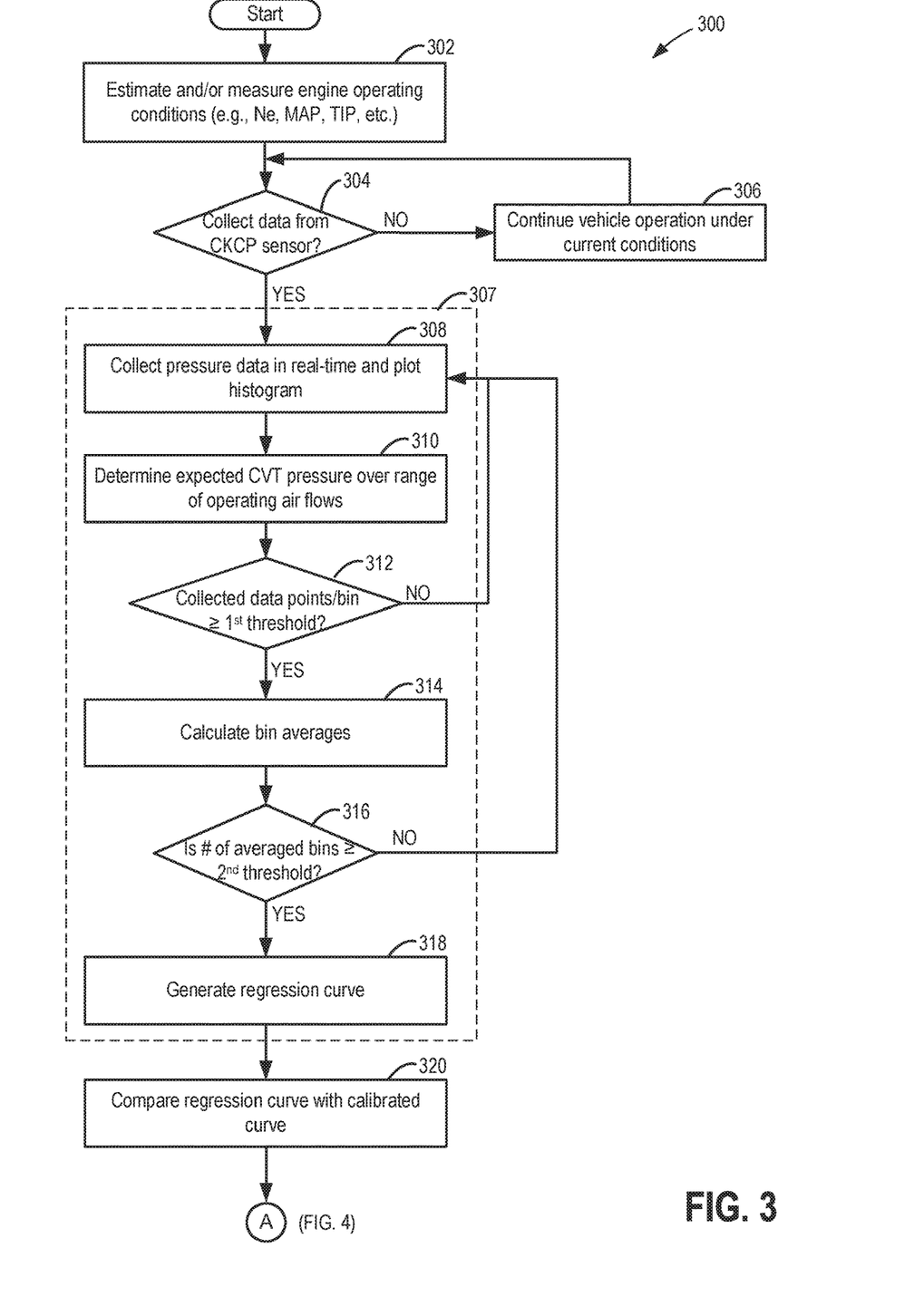
FIGS. 3 and 4 show an example of a routine for diagnosing an integrity of a PCV system using quadratic regression and histogram binning.

The following description relates to systems and methods for a positive crankcase ventilation (PCV) system. The PCV system may be implemented in a combustion engine, an example of which is illustrated in FIG. 1. The PCV system may include conduits coupling an air induction system (AIS) to a crankcase of the engine as well as a crankcase pressure (CKCP) sensor to measure a pressure of incoming air flow into the crankcase. Coupling of the PCV system to the engine is shown in greater detail in FIG. 2. An example of a routine for evaluating a status of the PCV system is shown in FIG. 3 and continued in FIG. 4. The routine includes regressing pressure measurements collected at low flows against a second order polynomial (e.g., quadratic). The regression allows the pressure data to be extended to high air flow regions of vehicle operation where pressure data may be scarce. Pressure measurements collected by the CKCP sensor is plotted in FIG. 5, comparing actual sensor measurements to estimated values where both sets of data are processed via the quadratic regression. The actual measurements may be evaluated against the estimated data to determine if the PCV system is breached, enabling mitigating actions to be performed if a break in a sealing of the PCV system is detected.

Turning now to FIG. 1, an example of a cylinder 14 of an internal combustion engine 10 is illustrated, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via an air induction system (AIS) including a series of intake air passages 142, 144, and intake manifold 146. Intake manifold 146 can communicate with other cylinders of engine 10 in addition to cylinder 14, as shown in FIG. 2. In some examples, one or more of the intake passages may include a boosting device, such as a turbocharger or a supercharger. For example, FIG. 1 shows engine 10 configured with a turbocharger 175, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

The AIS of vehicle 5 may also include a positive crankcase ventilation (PCV) system 200. Only a portion of the PCV system 200 is depicted in FIG. 1 for clarity and additional components of the PCV system 200 are shown in FIG. 2 and described further below. More specifically, a crankcase vent tube (CVT) 224 is shown in FIG. 2, coupling intake passage 142 to a crankcase of engine 10. The CVT 224 allows intake air to be drawn into the crankcase to purge the crankcase of blow-by gases when a PCV valve (as shown in FIG. 2) is open. In this way, degradation of components enclosed in the crankcase is circumvented.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples the engine may ignite the charge by compression as in a diesel engine.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake manifold 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a pressure in the CVT 224 measured by a crankcase pressure CKCP sensor (as shown in FIG. 2), a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold 146. Controller 12 may infer an engine temperature based on the engine coolant temperature and infer a temperature of catalyst 178 based on the signal received from temperature sensor 158. Additional sensors providing data to controller 12 are shown in FIG. 2 and described further below.

Controller 12 receives signals from the various sensors of FIGS. 1 and 2 and employs various actuators of FIGS. 1 and 2 to adjust engine operation based on the received signals and instructions stored on a memory of the controller. For example, upon receiving a signal from the MAP sensor 124, controller 12 may command opening of a positive crankcase ventilation (PCV) valve, as shown in FIG. 2 and described below, to vent the crankcase when the pressure in the intake manifold falls below a threshold value.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

An engine, e.g., engine 10 of FIGS. 1 and 2, may include a crankcase enclosing one or more cylinder bores as well as other engine components, such as crankshaft 140 of FIG. 1, an oil well (not shown) arranged below the crankshaft, etc. During a power stroke of the engine cylinders, a portion of the gases combusted within the cylinders may leak past a ring forming a seal around bases of the cylinder pistons in a process known as blow-by. The escaped blow-by gases may accumulate in the crankcase, resulting in a buildup of pressure which may degrade oil stored in the crankcase to lubricate piston movement. To preserve oil integrity and alleviate pressure in the crankcase, the engine may include a crank ventilation system, e.g., a PCV system, to vent gases out of the crankcase and into an intake manifold, e.g., intake manifold 146 of FIGS. 1 and 2.

FIG. 2 shows the PCV system 200 implemented in vehicle 5 in greater detail. In one example, the PCV system may be coupled to the engine 10 of FIG. 1 and as such, common components are similarly numbered in FIG. 2 and will not be re-introduced. A barometric pressure (BP) sensor 203 may be positioned proximate to an inlet of intake passage 142 to measure ambient pressure. An air filter 202 may be arranged in a pathway of air flow into intake passage 142 to remove particulate matter from incoming fresh air. Intake passage 142 further includes a first end of a compressor bypass 204 upstream of compressor 174. A second end of the compressor bypass 204 may couple to intake passage 144, downstream of compressor 174 and upstream of a charge air cooler (CAC) 206.

Compressor bypass 204 may route air around compressor 174 when a compressor bypass valve (CBV) 208 is open. Alternatively, air may be boosted by compressor 174 when an opening of the CBV 208 is adjusted to be less open or closed to force at least a portion of incoming air through compressor 174. Air flowing into intake passage 144 may be cooled via CAC 206, increasing a power density of the air prior to combustion at the engine 10. Intake passage 144 includes a throttle inlet pressure (TIP) sensor 210 downstream of CAC 206 and upstream of throttle 162 to detect a pressure in intake passage 144 and flows air in intake manifold 146. Passages coupling intake manifold 146 to each cylinder 14 of engine 10 are omitted in FIG. 2 for brevity.

Engine 10 is depicted with a crankcase 212 enclosing cylinder banks 214 with cylinders 14. The cylinder banks 214 may be arranged, in one example, in a "V" configuration, e.g., V6. However, other engine configurations have been contemplated. The crankcase 212 includes an oil fill cap 216 sealing an oil fill port 218 which allows delivery of oil to the oil well. The crankcase 212 also has a dipstick port 220 supporting a dipstick 222 used to measure an oil level in the oil well. A plurality of other orifices may be disposed in the crankcase 212 for servicing components in the crankcase 212 and may be maintained closed during engine operation to allow the PCV system 200 to operate.

The PCV system 200 is coupled to the AIS and the crankcase 212 of vehicle 5 by the CVT 224. The CVT 224 extends between intake passage 142, at a point downstream of the air filter 202 and upstream of the compressor bypass 204 and may be attached to intake passage 142 by a first fitting, such as a quick-connect fitting. However, other couplings are possible. The CVT 224 may attach to the crankcase 212 at a second fitting, which may also be a quick-connect fitting, and may couple the CVT 224 to a push-side oil separator 226.

Blow-by gases in the crankcase 212 may include un-burned fuel, un-combusted, air, fully or partially combusted bases, and lubricant mist. The push-side oil separator 226 may remove oil from a stream of gases exiting the crankcase 212 during boosted operation. Furthermore, oil mist may be removed from vapors flowing from the crankcase 212 to intake manifold 146 by a pull-side oil separator 232.

A crankcase pressure (CKCP) sensor 228 may be arranged in the crankcase 212 at the push-side oil separator 226. The CKCP sensor 228 may be configured as an absolute pressure sensor or a gauge sensor, in some examples. In other examples, the sensor 228 may instead be a flow sensor or flow meter. More specifically, the CKCP sensor 228 may be positioned at a clean side, e.g., only fresh air flows across the CKCP sensor 228, of the push-side oil separator 226. The CVT 224 is thereby isolated to one side of the CKCP sensor 228 which precludes a dependency on more than one sensor or algorithm for PCV system monitoring. A single sensor adapted with a single monitoring algorithm may thus be able to detect all breaches associated with the CVT 224.

In another example, the CKCP sensor 228 may instead be integrated into an AIS connector housing. A monitoring algorithm, as executed by controller 12, used in conjunction with the CKCP sensor 228 may be configured to respond to expected pressure signals generated by the crankcase 212 and not signals generated by the AIS. As such, the CKCP sensor 228 and the monitoring algorithm may isolate the expected pressure signals from a pressure source on an opposite side of the CVT 224, adding complexity to the algorithm.

By positioning the CKCP sensor 228 on the clean side of the push-side oil separator 226, the CKCP sensor 228 may be isolated from harsh conditions in the crankcase 212 (e.g., oil contamination). Furthermore, the push-side oil separator 226 may be configured to close under known engine operating conditions, such as at low pressure gradients across the push-side oil separator 226, and open under other operating conditions. As a result, the monitoring algorithm may be optimized to use a pressure signal during select engine operating conditions, circumventing distinguishing of confounding signals during less desirable operating conditions, such as when the AIS vacuum dominates the CKCP sensor signal at high engine air flows. As well, the CKCP sensor may collect more data during non-boosted conditions than boosted conditions. Use of a single pressure sensor and monitoring algorithm is enabled as opposed to measuring both the AIS and crankcase pressures and determining how the signals may destructively interact under certain engine operating conditions.

Intake air may flow, as indicated by arrows 230, from intake passage 142 into CVT 224, into the crankcase 212 via the push-side oil separator 226 and exit the crankcase 212 through the pull-side oil separator 232 when a PCV valve 234 is open. The PCV valve 234, in one example, may be a one-way valve (e.g., a passive valve that seals when flow is in an opposite direction), that opens to provide forward flow when pressure in intake manifold 146 is low, e.g., under vacuum. The PCV valve 234 may vary its flow restriction in response to a pressure drop across the valve, as an example. Alternatively, in other examples, the PCV valve 234 may not be a one-way valve. For example, the PCV valve 234 may be an electronically controlled valve adjusted by controller 12. It will be appreciated that the PCV valve 234 may be configured as any of a variety of valve types without departing from the scope of the present disclosure.

When the pressure in intake manifold 146 is sufficiently low, e.g., below a threshold pressure such as atmospheric pressure, the PCV valve 234 may open to allow blow-by gases to flow to intake manifold 146 via a PCV line 236 coupling the crankcase 212 to intake manifold 146. Thus the crankcase 212 may be vented in a controlled manner.

As described above for FIG. 1, the CKCP sensor 228 may be one of a number of sensors 240 arranged in the vehicle 5, sending signals to the controller 12. In response, the controller 12 may send commands to any of a variety of actuators 250 disposed in vehicle 5. As an example, pressure measurements provided by the CKCP sensor 228 may be leveraged to monitor a status of the PCV system 200 and actuators, such as the throttle 162, the CBV valve 208, etc. may be adjusted in response to detection of a breach to decrease air flow to the engine. For example, OBD cycles may include testing the PCV system 200 at a target frequency to ensure that breaches in the PCV system 200, such as a rupture or disconnect in the CVT 224, are detected early on. In one example, the target frequency may be a minimum frequency of monitoring events per drive corresponding to an In-Use Performance Ratio (IUPR) of greater than 34%, as according to California Air Resources Board (CARB) regulations. In order to robustly detect breaches in the PCV system, the vehicle's OBD may demand vehicle operation a high air flows to initiate a diagnostic cycle. For example, monitoring of the PCV system may only occur when boosted air is delivered to the combustion chambers and/or when the intake manifold is at positive pressure.

However, a majority of drive cycles may operate the vehicle at lower air flows that preclude PCV system monitoring. For example, high power-to-weight vehicles may be primarily driven along routes where low engine loads are sufficient to meet a torque demand. Drive cycles may not include vehicle operation at sufficiently high air flows to enable OBD to evaluate PCV system integrity at a predetermined frequency. As such, vehicles unable to meet stringent IUPRs may be recalled, leading to costly penalties for vehicle manufacturers.

In one example, as described herein, a vehicle may meet a target IUPR by implementing a method of monitoring a PCV system of the vehicle using a second order polynomial regression calculated in real-time at a controller, e.g., a power control module (PCM) of the vehicle. The regression, e.g., a quadratic regression algorithm, may be calculated during each vehicle drive cycle and a curve determined via the regression may be extended to high air flows where a breach detection capability of the vehicle's OBD is maximized. A robustness of the regression curve may be enhanced by generating a histogram over a full range of vehicle operating air flows and averaging a measured pressure in each bin of the histogram. Bin averages are calculated when a preset minimum number of data samples are obtained where a bin size may be increased at higher air flows to increase a likelihood that the minimum number of data samples are collected. As a result, each histogram bin is equally weighted in the regression curve and identification of a breached or faulted system is enabled at high air flows, where distinction between faulted and intact systems is maximized.

Figure 4:
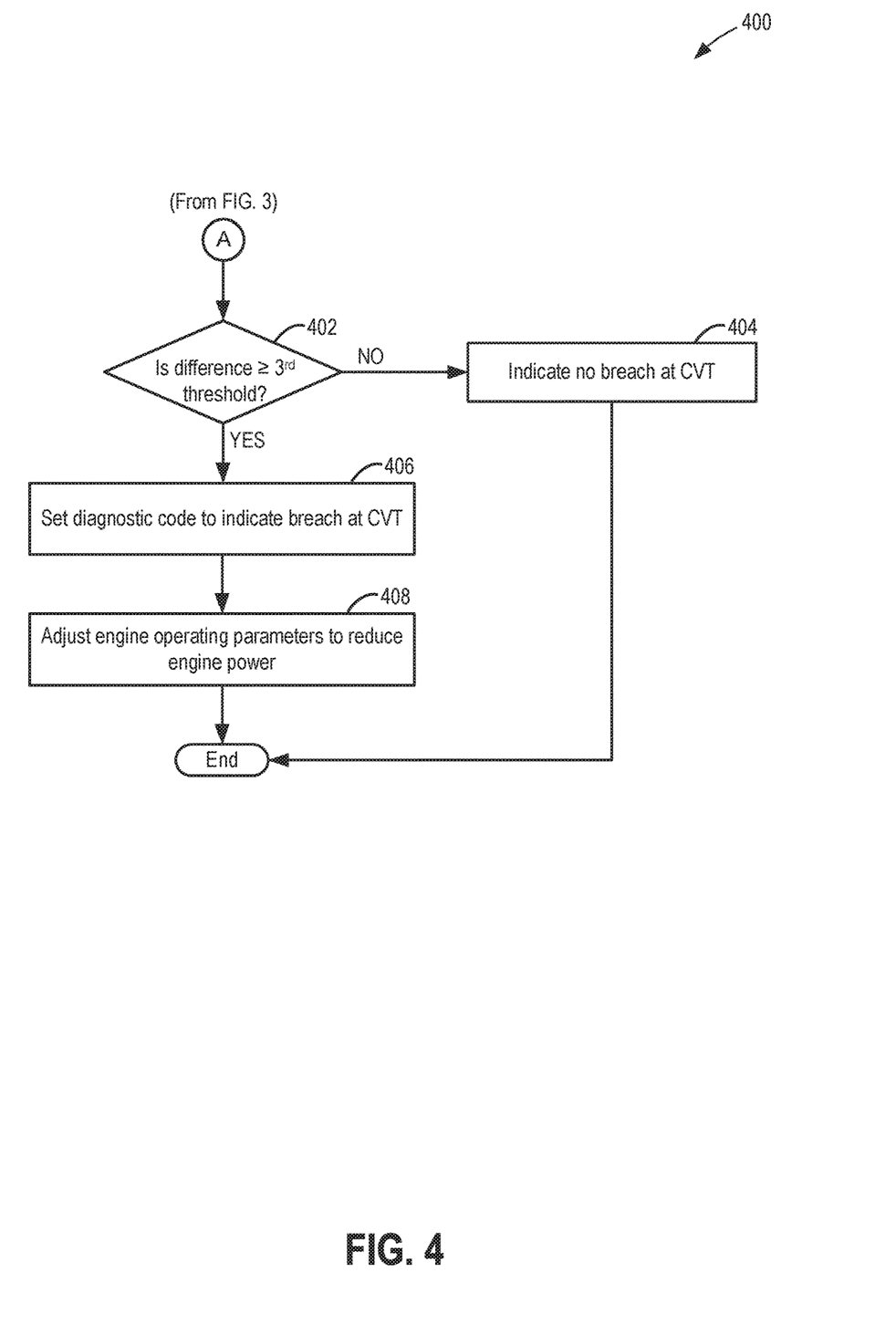
Figure 5:
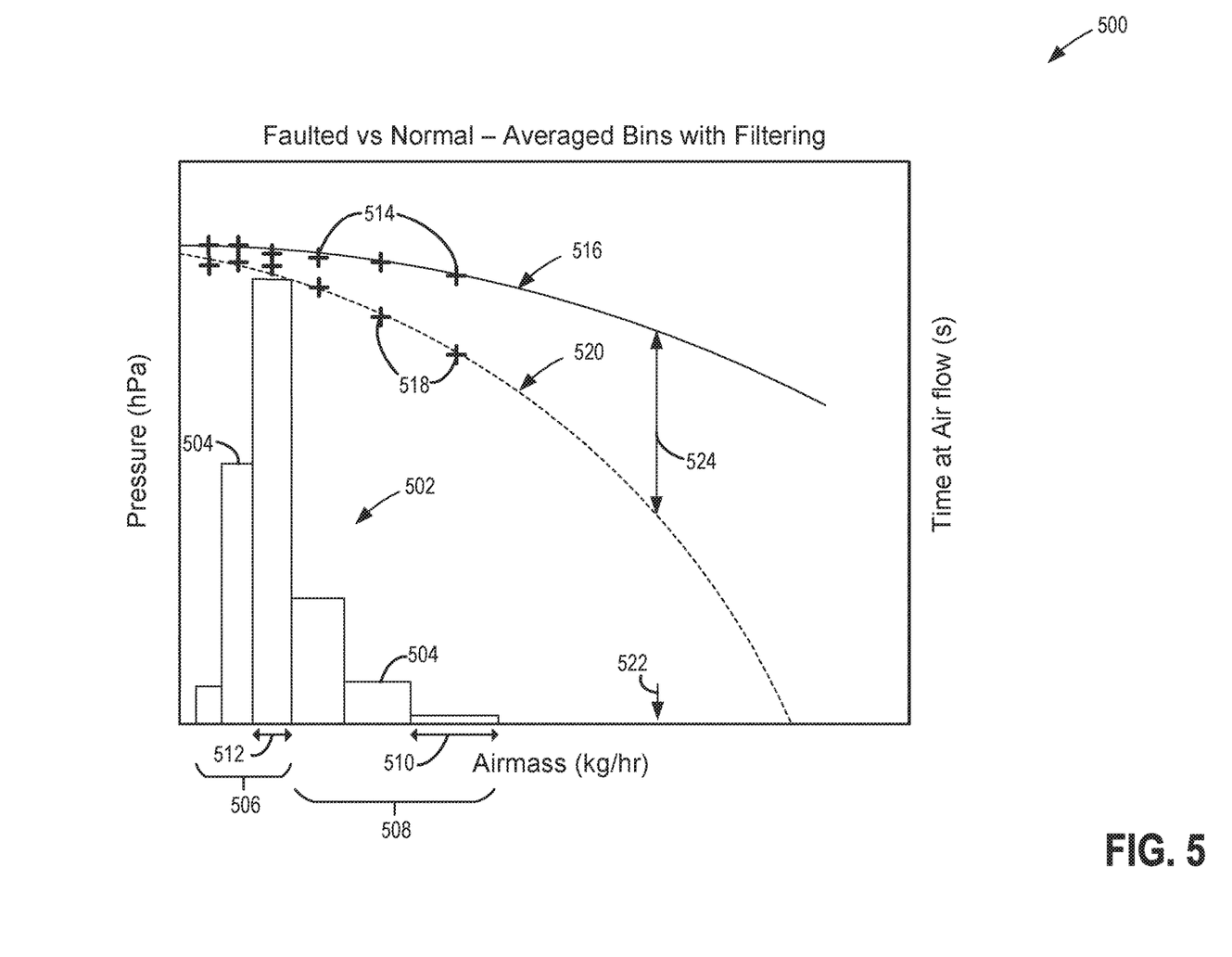
FIG. 5 shows a comparison of expected versus actual pressure data for a PCV system with a breach.

Examples of routines 300 and 400 for a monitoring system to assess an integrity of a PCV system via a real-time quadratic regression algorithm is shown in FIG. 3 and continues in FIG. 4, respectively. The routines 300, 400 may be implemented in a vehicle, such as vehicle 5 of FIGS. 1 and 2 and may be initiated upon detection of engine operation, such as a key-on event. As shown in FIG. 2, the vehicle may have a PCV system coupled to a crankcase of the vehicle's engine, the PCV system including a CVT coupling the crankcase to the vehicle's AIS. Flow of gases through the PCV system and into an intake manifold of the vehicle may be controlled by a PCV valve, such as the PCV valve 234 of FIG. 2, and the PCV valve may be positioned in a PCV line (e.g., the PCV line 236 shown in FIG. 2) extending between the crankcase and the intake manifold.

The PCV system further includes a CKCP sensor coupled to a push-side oil separator in the crankcase, as shown in FIG. 2, which may be configured to detect a pressure in the CVT and send the pressure measurements to a controller, e.g., controller 12 of FIGS. 1 and 2, of the vehicle. Instructions for carrying out routines 300 and 400 and the rest of the methods included herein may be executed by the controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, routine 300 includes estimating engine operating conditions. For example, the controller may receive information about engine speed from a Hall effect sensor, such as the Hall effect sensor 120 of FIG. 1, intake manifold pressure from a MAP sensor, such as the MAP sensor 124 of FIGS. 1 and 2, a position of an accelerator pedal, such as the pedal position sensor 134 of FIG. 1, a throttle inlet pressure such as the TIP sensor 210 of FIG. 2.

The routine includes confirming if data is to be collected from the CKCP sensor at 304. Data collection may be initiated based on a target IUPR, such as 34%, upon which a desired frequency of PCV monitoring may be determined. For example, PCV monitoring may be initiated after a predetermined amount of time has elapsed since a previous monitoring event. As an example, the controller may command the monitoring system to utilize data collection from the CKCP sensor every 10 minutes during vehicle operation, provided that the engine is running and a tip-in or steady throttle event is detected, e.g., data is not collected during tip-out and closed throttle events. By collecting data during engine operation and tip-in or steady throttle conditions, sampling bias is reduced which may otherwise occur if data is collected continuously until a sufficient number of samples has been obtained. In addition, data collection may be dependent on the PCV valve being in an open position, allowing vacuum at the intake manifold to draw down a pressure in the crankcase and CVT. As another example, data collection may be initiated upon detection of a new tip-in event and continue at a pre-determined frequency until a tip-out event occurs. In yet another example, an operator may map a travel route into a GPS system of the vehicle and the controller may determine a number of monitoring cycles based on an estimated duration of the travel route to obtain the target IUPR. Furthermore, the controller may determine that data is not to be obtained from the CKCP sensor for PCV monitoring when an ambient temperature is below freezing (e.g., as measured by a temperature sensor) as freezing conditions may cause large air flow restrictions through the AIS. As well, data from the CKCP sensor may not be collected when a measured air flow (e.g., by MAF sensor 122 of FIG. 1) into the AIS does not meet a minimum calibratable air flow, such as 25 kg/hr.

If data is not to be collected from the CKCP sensor for PCV monitoring, e.g., a tip-out/closed throttle event is detected or ambient temperature is below freezing, the routine proceeds to continue vehicle operation under current conditions at 306, without PCV monitoring, and returns to 304 to determine again if data from the CKCP sensor is to be collected. However, if CKCP sensor data collection is to be initiated, the routine continues to 307 to generate a regression curve from the data obtained from the CKCP sensor. At 307, a number of data processing operations may be performed by the controller to assess collected data and generate a robust regression curve. For example, the data processing operations may include collecting pressure data in real-time, e.g., actual data, at 308. The actual pressure data may be stored in the controller's memory and correlated with data collected from other sensors. For example, each pressure data point may be stored with a corresponding mass airflow measurement, e.g., as obtained by MAF sensor 122 of FIG. 1, at a specific duration of time. Furthermore, the actual pressure data may be plotted as a histogram, as shown in FIG. 5 and described further below.

At 310, the routine includes determining an expected pressure of the CVT over an expected range of operating air flows (e.g., from the minimum calibratable air flow to a maximum operating air flow) for a duration of time. For example, expected CVT pressures corresponding to each of the actual pressure data points may be determined based on engine operating conditions such as engine air flow, engine speed, boost pressure, intake manifold pressure, barometric pressure, etc. Determining the expected CVT pressures may occur simultaneously with CKCP sensor data collection.

The routine determines whether a number of pressure measurements in each bin of the histogram of actual CVT pressure, as obtained from the CKCP sensor, reaches a first threshold at 312. In one example, each bin may be evaluated individually and may proceed without dependency on evaluation of other bins. However, generation of a regression curve may be delayed until all histogram bins have sufficient data points to meet the first threshold. The first threshold may be a minimum number of data points to enable histogram bin averaging. For example, actual pressure measurements within a bin may be averaged when the number of measurements meets a minimum calibrated or statistical criteria for sample number, sample spread, and residency time in the bin.

If the number of pressure measurements in the bin of the histogram does not at least reach the first threshold, the routine returns to 308 to continue collecting pressure data. Additionally or alternatively, bin widths may be adjusted to increase a number of pressure measurements for an air flow range where a duration of vehicle operation during a drive cycle within the air flow range is low. For example, as shown in graph 500 in FIG. 5, a histogram 502 of collected pressure measurements may have variable bin widths. Graph 500 depicts pressure along a first y-axis, duration of time along a second y-axis and airmass (e.g., air flow) along the x-axis.

The histogram 502 of graph 500 includes bins 504, each of the bins 504 depicting an amount of time (e.g., as defined along the second y-axis) of vehicle operation at a given range of airmass (e.g., as defined along the x-axis). As shown in by the histogram 502, a greater duration of vehicle operation occurs at low air flows, within a first zone 506 and a second zone 508 of airmass. Furthermore, more time is spent at low air flows encompassed by the first zone 506 than the second zone 508. As such, more data is collected by the CKCP sensor at the first zone 506 and the first zone 506 may be a high data density zone. An amount of collected pressure data may decrease with increasing airmass. At airmasses greater than the range of airmasses of the second zone 508, data density may be low. Within the second zone 508, an increasing scarcity of data points with increasing airmass may result in rejection of the pressure measurements and prolonged delays in PCV system monitoring if bin widths were equal across the entire operating air flow range.

To compensate for the uneven distribution of actual pressure data, the bin widths may be adjusted to increase the number of data points in the bins of the second zone 508. For example, as shown in graph 500, the widths 510 of the bins 504 in the second zone 508 may be increased relative to the widths 512 of the bins 504 in the first zone 506. The widening of the bins 504 may vary for each bin and may be optimized based on data point distribution. As a result, a frequency cycle of PCV system monitoring, dependent on the number of data points in each bin 504 reaching the first threshold, may be increased.

Returning to routine 300 of FIG. 3, if the number of data points in each bin reaches the first threshold, the routine continues to 314 to calculate an average pressure value for each bin with enough data points to be averaged. As an example, the average pressure value for each bin is depicted by a first set of averaged data 514 in graph 500 of FIG. 5. As such, bin averages may be calculated for bins with sufficient data points while averaging of bins falling short of the first threshold may be delayed until enough data is collected. For the histogram bins without sufficient data points to meet the first threshold at 312, even with bin widening, the routine includes returning to 308 to collect more pressure measurements.

At 316, the routine includes determining if a number of averaged bins reaches a second threshold. The second threshold may be a quantity of averaged values that provides enough information to generate a regression curve from the averaged values. For example, the regression analysis may demand a minimum number of bin averages above a minimum air mass flow.

If an insufficient quantity of bin averages is confirmed, the routine returns to 308 to continue collecting pressure data from the CKCP sensor. However, if enough bin averages are calculated to meet the second threshold, the routine proceeds to 318 to generate the regression curve. The regression curve may be obtained by regressing the bin averages against a second order polynomial, as shown in equation 1, for determining a minimum error (min Err):

$$\min \text{Err} = \Sigma / [F(x) - (aX^2 + bX + c)]^2 \quad (1)$$

where $F(x)$ is the bin average of the actual pressure measurements at a center of each histogram bin, as shown in FIG. 5 by the first set of averaged data 514, and X is the airmass value at the center of each histogram bin. By solving each of a, b, and c of equation 1, the regression curve may be generated based on the actual pressure measurements, as shown by a first regression curve 516 in FIG. 1. In the exemplary graph 500 of FIG. 5, the first set of averaged data 514 represents measured pressure in the CVT when a breach is present, e.g., the CVT is disconnected or ruptured. Hereon, the first set of averaged data 514 is referred to as representing a "faulted" state of the PCV system. The first regression curve 516 extrapolates data from the first and second zones 506, 508 of airmass to high air flows beyond a maximum airmass value of the second zone 508 where little to no data is collected. As described above, vehicle OBD may demand air flows at flows equal to or greater than the air flows of the second zone 508, e.g., where data density is low. By utilizing regressed data calculated from bin averages, pressure values for high air flows may be provided via a robust method that allows equal weight from each histogram bin. In addition, by creating the histogram over the full range of engine operating air flows and averaging the measured pressure in each bin, noise in the regression curve may be minimized.

Furthermore, generation of the first regression curve may enable a numerator of an IUPR (e.g., a number of PCV system monitoring events) to be incremented, where the denominator is bound to a minimum intake manifold pressure. The incrementation allows the monitoring to the PCV system to be completed, thus providing data points for high engine air flow regions not achieved during a current drive cycle.

Returning to FIG. 3, the routine includes comparing the regression curve generated by the bin averages (e.g., the first regression curve 516 of FIG. 5) with a calibrated curve at 320. The calibrated curve may be obtained from the expected CVT pressures over the range of operating air flows (e.g., as calculated at 310 of routine 300). The expected CVT pressures, as shown in FIG. 5 by a second set of data 518, may also be regressed according to the second-order polynomial of equation 1 to obtain a second regression curve 520. The second regression curve 520 may also be a calibrated curve 520. The calibrated curve 520 shows increasingly lower pressures expected in the CVT as air flow (e.g., airmass) increases. The pressure drawdown results from transmission of low pressure at the intake manifold to the CVT via opening of the PCV valve. As vacuum accumulates in the intake manifold, gases are increasingly vented out of the crankcase, thus augmenting air flow through the CVT and clean side of the PCV system.

The first regression curve 516 may be compared to the calibrated curve 520 by determining a difference between a pressure value of each curve at a calibrated airmass value. For example, a high airmass or air flow value may be used by the vehicle OBD to monitor the PCV system, such as 1200 kg/hr, as indicated at a calibrated airmass 522 in graph 500 of FIG. 5. The calibrated airmass 522 may be an airmass value higher than airmass values encompassed by both the first zone 506 and the second zone 508. The selected calibrated airmass 522 may be a high air flow value where separation between pressures for the faulted PCV system and expected pressures is maximized. As shown in graph 500, at low airmasses, e.g., within the first zone 506, a difference between measured pressure depicted by the first regression curve 516 and expected pressure depicted by the calibrated curve 520 is smaller than a difference between the measured pressure and expected pressure at the calibrated airmass 522. Thus comparing the curves at high air flows provides more reliable and robust analysis of the PCV system integrity than at low air flows.

When the PCV system experiences a breach at a clean side of the system, e.g., the CVT is ruptured and/or disconnected, a pressure measured at the CKCP sensor may be higher than expected. This results from the breach allowing surrounding air, external to the crankcase and CVT to leak into the PCV system, offsetting a drawdown in pressure imposed by the AIS. In some examples, as shown in graph 500, the breach may still allow pressure to decrease with increasing air flow through the AIS. In other examples when the breach is large, the CKCP sensor may detect little to no change in pressure with air flow, e.g., the first regression curve 516 may be flat. Thus, relying on data comparison at high air flows may allow detection of even small breaches in the PCV system when separation between the actual and expected data may be less distinct.

Turning now to FIG. 4, routine 300 continues to 402 of routine 400 to determine if a difference between the regression curve generated by the measured pressure data and the expected pressure data at the calibrated airmass value is greater than a third threshold. The third threshold may be a difference between the measured pressure and expected pressure at a given airmass (e.g., the calibrated air mass value) that infers presence of a breach in the PCV system at the CVT when surpassed. For example, the third threshold may be a difference between the measured and expected pressures of 40%, in one example, of the expected pressure. When the difference is at or greater than 40% of the expected pressure, the PCV system may be deemed faulted.

If the difference does not reach or surpass the third threshold, routine 400 proceeds to 404 to indicate that CVT of the PCV system is intact on the clean side of the PCV system. Indicating that the CVT is intact may include not presenting a diagnostic code. Vehicle operation may continue under the current operating conditions. The routine ends.

In another example, the breach in the PCV system may be detected by integrating an area above the regression curve of the measured pressure data and below a zero pressure/atmospheric curve. The integrated area may be compared to an expected area, similarly obtained by integrating an area between the regression curve of the expected pressure data and below the zero pressure/atmospheric curve for an intact PCV system. The breached PCV system may differentiated from the intact PCV system by a lower integrated area.

If the difference reaches or surpasses the third threshold, the routine continues to 406 to set a diagnostic code to alert an operator of a breach in the PCV system. More specifically, indication that the CVT is ruptured and/or disconnected may be provided. Setting the diagnostic code may include illuminating a warning light on the vehicle dashboard. At 408, the routine includes adjusting one or more engine operating parameters in response to the detected breach in the PCV system. For example, engine boost output may be reduced by increasing an opening of an exhaust wastegate coupled across a turbine to moderate engine power. As another example, an opening of a compressor bypass valve, e.g., CBV 208 of FIG. 2, may be increased.

A quadratic regression algorithm may further be utilized to evaluate an integrity of other vehicle components. For example, a diagnostic fault in other regions of an AIS may be detected. As one example, a condition of a vehicle air filter may become clogged over time, restricting flow therethrough. As flow restriction through the air filter increases, a pressure may increase in the AIS on a downstream side of the air filter may decrease with increasing air flow. For example, an air filter may be deemed no longer useful when a 2.5 kPa drop in pressure at full AIS air flow is detected. However, as the vehicle may operate at full air flow infrequently, diagnosis of an ineffective air filter may be delayed, reducing engine performance. By applying the quadratic regression algorithm to pressure measurements in the AIS across the air filter, a degraded air filter may be identified efficiently, reducing an occurrence of downgraded engine output resulting from the clogged air filter.

In this way, a PCV system may be monitored in real-time for a breach in a CVT coupling an AIS to a crankcase of a vehicle. By regressing measured pressure at a clean side of the PCV system via a second order polynomial, pressure data collected at lower air flows than demanded by the vehicle's OBD may be leveraged to meet the OBD criteria for assessing a status of the PCV system. For example, more pressure data may be obtained during non-boosted engine operation then during boosted operation. A high data density at low air flows may be extrapolated to high air flow regions of operation, where data density is low or scarce, such that a difference in pressure between a faulted (e.g., breached) system and an intact system may be maximized. A likelihood of error in breach detection is thereby reduced and stringent regulations for monitoring frequency may be met. The regression is calculated based on a histogram encompassing pressure measurements over a full range of air flows expected for vehicle operation. Bins of the histogram may be averaged and widths of the bins may be adjusted to ensure each bins includes a minimum number of data points. Each bin, with respect to air flow regions, may therefore have equal weight in the resulting regression curve. Application of noise filters is precluded by using values from averaged histogram bins. Thus real-time PCV monitoring via data regression may allow emission regulations to be met using a low cost, reliable method applicable to a variety of vehicle types. The technical effect of data regression via a second order polynomial is that pressure measurements for a breached PCV system are readily distinguished from an intact PCV system using data collected by a crankcase pressure sensor at low air flows.

The disclosure also provides support for a method for a crankcase ventilation system, comprising: indicating a breach in the crankcase ventilation system based on a regression of pressure measurements of a crankcase vent tube pressure over an entire range of operating engine air flows and comparison of regressed pressure measurements to expected crankcase vent tube pressure over the entire range of operating engine air flows. In a first example of the method, regressing the pressure measurements over the entire range of operating engine air flows includes calculating the regression at each possible air flow at which the engine is operable from a determined minimum operable air flow to a determined maximum operable air flow, the pressure measurement including more measurements obtained during non-boosted conditions than boosted conditions. In a second example of the method, optionally including the first example, indicating the breach based on the regression includes plotting the pressure measurements as a histogram showing an amount of time of vehicle operation at each air flow of the entire range of operating air flows. In a third example of the method, optionally including the first and second examples, indicating the breach based on the regression includes determining an average pressure value for each bin of the histogram to generate a plurality of bin averages and generating a first regression curve from the plurality of bin averages via a second order polynomial. In a fourth example of the method, optionally including the first through third examples, generating the first regression curve includes solving the second order polynomial to obtain a minimum error for each bin average, with respect to air flow, of the plurality of bin averages. In a fifth example of the method, optionally including the first through fourth examples, generating the first regression curve further includes adjusting a width of each bin of the histogram to weight each bin equally in the first regression curve and wherein the adjusting includes increasing a width of each bin of the histogram having low vehicle operating time. In a sixth example of the method, optionally including the first through fifth examples, indicating the breach further includes generating a second regression curve from the expected crankcase vent tube pressure based on the second order polynomial. In a seventh example of the method, optionally including the first through sixth examples, indicating the breach includes determining a difference between the first regression curve and the second regression curve at a calibrated air flow and wherein the breach is confirmed when the difference is equal to or greater than a threshold. In an eighth example of the method, optionally including the first through seventh examples, determining the difference between the first and second regression curves at the calibrated air flow includes comparing a first pressure value of the first regression curve and a second pressure value of the second regression curve at a high air flow and wherein separation between the first and second regression curves is greater at the high air flow than at low air flows. In a ninth example of the method, optionally including the first through eighth examples, indicating the breach includes extrapolating the pressure measurements at low air flows to high air flows using the regression.

The disclosure also provides support for a method for an engine, comprising: over a range of operating air flows, collecting actual crankcase vent tube pressure measurements at low air flows while estimating expected crankcase vent tube pressure measurements, generating a histogram from the actual crankcase vent tube pressure measurements, calculating an average pressure value for each bin of the histogram, generating a first regression curve from the average pressure value of each bin of the histogram, the first regression curve based on a second order polynomial and extending from the low air flows to high air flows, and generating a second regression curve from the expected crankcase vent tube pressure measurements, and indicating a breach in a crankcase vent tube based on a difference between the first regression curve and the second regression curve at a high air flow being greater than a threshold. In a first example of the method, collecting actual crankcase vent tube pressure measurements includes measuring a pressure at a clean side of a push-side oil separator by a crankcase pressure (CKCP) sensor and wherein the crankcase vent tube is isolated to one side of the CKCP sensor. In a second example of the method, optionally including the first example, measuring the pressure by the CKCP sensor includes initiating pressure data collection when the engine is operating, a positive crankcase ventilation valve is open, and one of a tip-in or a steady throttle event is detected. In a third example of the method, optionally including the first and second examples, calculating the average pressure value for each bin of the histogram includes collecting actual crankcase vent tube pressure measurements until a number of pressure measurements in each bin reaches a minimum number of pressure measurements. In a fourth example of the method, optionally including the first through third examples, generating the first regression curve includes collecting actual crankcase vent tube pressure measurements until a number of averaged bins reaches a minimum number of averaged bins. In a fifth example of the method, optionally including the first through fourth examples, generating the histogram includes increasing a width of bins at high air flows to equalize a weight of each bin in the first regression curve. In a sixth example of the method, optionally including the first through fifth examples, the method further comprises: detecting the breach based on integration of an area above the first regression curve and comparing the integrated area above the first regression curve to an integrated area above the second regression curve and wherein the breach is indicated when the integrated area above the first regression curve is less than the integrated area above the second regression curve. In a seventh example of the method, optionally including the first through sixth examples, the method further comprises: detecting the breach by extrapolating the actual crankcase vent tube pressure measurements to air flows not achieved by a current drive cycle of the engine via generation of the first regression curve and wherein the extrapolation enables incrementation of a numerator of an in-use performance ratio for the engine.

The disclosure also provides support for a method for an engine, comprising: determining a diagnostic fault for an air induction system using a quadratic regression algorithm to estimate pressure values at high air flows from pressure measurements collected at low air flows, and responsive to detection of the fault, providing an indication of the fault and adjusting engine operations to reduce engine power. In a first example of the method, determining the diagnostic fault includes identifying a clogged engine air filter.

In another representation, a method includes, during one of a driver tip-in event and a steady throttle event, collecting a plurality of crankcase pressure readings via a crankcase pressure sensor, determining degradation responsive to a quadratic regression at a pre-determined airflow below a threshold value, the quadratic regression based on a histogram bin averaging of the plurality of crankcase pressure readings.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a crankcase ventilation system, comprising:
    indicating a breach in the crankcase ventilation system based on a regression of pressure measurements of a crankcase vent tube pressure over an entire range of operating engine air flows for an engine and comparison of regressed pressure measurements to expected crankcase vent tube pressure over the entire range of operating engine air flows,
    wherein indicating the breach includes extrapolating the pressure measurements at low air flows to high air flows using the regression.

2. The method of claim 1, wherein regressing the pressure measurements over the entire range of operating engine air flows includes calculating the regression at each possible air flow at which the engine is operable from a determined minimum operable air flow to a determined maximum operable air flow, the pressure measurements including more measurements obtained during non-boosted conditions than boosted conditions.

3. The method of claim 1, wherein indicating the breach based on the regression includes plotting the pressure measurements as a histogram showing an amount of time of vehicle operation at each air flow of the entire range of operating air flows.

4. The method of claim 3, wherein indicating the breach based on the regression includes determining an average pressure value for each bin of the histogram to generate a plurality of bin averages and generating a first regression curve from the plurality of bin averages via a second order polynomial.

5. The method of claim 4, wherein generating the first regression curve includes solving the second order polynomial to obtain a minimum error for each bin average, with respect to air flow, of the plurality of bin averages.

6. The method of claim 5, wherein generating the first regression curve further includes adjusting a width of each bin of the histogram to weight each bin equally in the first regression curve and wherein the adjusting includes increasing a width of each bin of the histogram having low vehicle operating time.

7. The method of claim 4, wherein indicating the breach further includes generating a second regression curve from the expected crankcase vent tube pressure based on the second order polynomial.

8. The method of claim 7, wherein indicating the breach includes determining a difference between the first regression curve and the second regression curve at a calibrated air flow and wherein the breach is confirmed when the difference is equal to or greater than a threshold.

9. The method of claim 8, wherein determining the difference between the first and second regression curves at the calibrated air flow includes comparing a first pressure value of the first regression curve and a second pressure value of the second regression curve at a high air flow and wherein separation between the first and second regression curves is greater at the high air flow than at low air flows.

10. A method for an engine, comprising:
    over a range of operating air flows, collecting actual crankcase vent tube pressure measurements at low air flows while estimating expected crankcase vent tube pressure measurements;

generating a histogram from the actual crankcase vent tube pressure measurements;

calculating an average pressure value for each bin of the histogram;

generating a first regression curve from the average pressure value of each bin of the histogram, the first regression curve based on a second order polynomial and extending from the low air flows to high air flows, and generating a second regression curve from the expected crankcase vent tube pressure measurements; and indicating a breach in a crankcase vent tube based on a difference between the first regression curve and the second regression curve at a high air flow being greater than a threshold.

11. The method of claim 10, wherein collecting actual crankcase vent tube pressure measurements includes measuring a pressure at a clean side of a push-side oil separator by a crankcase pressure (CKCP) sensor and wherein the crankcase vent tube is isolated to one side of the CKCP sensor.

12. The method of claim 11, wherein measuring the pressure by the CKCP sensor includes initiating pressure data collection when the engine is operating, a positive crankcase ventilation valve is open, and one of a tip-in or a steady throttle event is detected.

13. The method of claim 10, wherein calculating the average pressure value for each bin of the histogram includes collecting actual crankcase vent tube pressure measurements until a number of pressure measurements in each bin reaches a minimum number of pressure measurements.

14. The method of claim 10, wherein generating the first regression curve includes collecting actual crankcase vent tube pressure measurements until a number of averaged bins reaches a minimum number of averaged bins.

15. The method of claim 10, wherein generating the histogram includes increasing a width of bins at high air flows to equalize a weight of each bin in the first regression curve.

16. The method of claim 10, further comprising detecting the breach based on integration of an area above the first regression curve and comparing the integrated area above the first regression curve to an integrated area above the second regression curve and wherein the breach is indicated when the integrated area above the first regression curve is less than the integrated area above the second regression curve.

17. The method of claim 10, further comprising detecting the breach by extrapolating the actual crankcase vent tube pressure measurements to air flows not achieved by a current drive cycle of the engine via generation of the first regression curve and wherein the extrapolation enables incrementation of a numerator of an in-use performance ratio for the engine.

18. A method for an engine, comprising:
determining a diagnostic fault for an air induction system using a quadratic regression algorithm to estimate pressure values at high air flows from pressure measurements collected at low air flows; and
responsive to detection of the fault,
providing an indication of the fault and adjusting engine operations to reduce engine power,
wherein determining the diagnostic fault includes identifying a clogged engine air filter.

* * * * *